June 12, 1956  O. W. BARKER ET AL  2,749,811
TRANSFER MACHINES

Filed Jan. 31, 1952  8 Sheets-Sheet 1

Fig.1

INVENTORS
Orrin W. Barker
BY Joseph J. Lenert

Elroy J Wutschel
Attorney

June 12, 1956  O. W. BARKER ET AL  2,749,811
TRANSFER MACHINES

Filed Jan. 31, 1952  8 Sheets-Sheet 3

INVENTORS.
Orrin W. Barker
Joseph J. Lenert
BY
Attorney

Fig. 12

INVENTORS.
Orrin W. Barker
Joseph L. Lenert
BY
Elroy J Wutschel
Attorneys

June 12, 1956   O. W. BARKER ET AL   2,749,811
TRANSFER MACHINES

Filed Jan. 31, 1952   8 Sheets-Sheet 8

Fig. 13

INVENTORS
Orrin W. Barker
Joseph J. Lenert
BY Elroy J. Wutschel
Attorney

United States Patent Office 2,749,811
Patented June 12, 1956

2,749,811

TRANSFER MACHINES

Orrin W. Barker, New Berlin, and Joseph J. Lenert, Milwaukee, Wis., assignors to Kearney & Trecker Corporation, West Allis, Wis., a corporation of Wisconsin Application January 31, 1952, Serial No. 269,191

18 Claims. (Cl. 90—15)

This invention relates generally to machine tools for performing metal removing operations, and has more particular reference to an improved milling machine especially adapted to perform a multiplicity of machining operations on several workpieces simultaneously.

A general object of the present invention is to provide an improved milling machine in which a series of similar workpieces are advanced successively through a plurality of aligned work stations and in which after each positioning of the workpieces, tool elements are movable in a single unidirectional traverse to perform different operations on the workpieces.

Another object is to provide a machine tool of the above character in which workpieces are transferred from station to station by a spindle head while moving in its return stroke after completing a machining operation.

Another object is to provide an improved positioning mechanism for accurately positioning the several workpieces simultaneously, preparatory to a machining operation.

Another object is to provide an improved clamping mechanism for securing the workpieces after they have been positioned, without affecting their position.

Another object is to provide automatically actuated pins on the spindle head unit for the purpose of effecting the combined functions of connecting the workpiece to cause it to move with the spindle head unit, and positioning it relative to the cutter.

Another object is to move a plurality of workpieces simultaneously from several stations to their succeeding stations.

Another object is to combine a workpiece transfer means with the movement of the cutters, whereby a separate transfer stage is eliminated from the sequence of operations.

Another object is to actuate the workpiece moving pins by combined hydraulic and mechanical means whereby a smooth operation will be obtained with positive mechanical movements.

According to this invention there is provided an improved milling machine especially adapted for performing several operations on a workpiece at separate stations, wherein the workpiece moves automatically through the machine, without being handled by the operator. In the present embodiment, two operations are performed on the workpiece successively, with separate operations upon two workpieces being performed simultaneously. The workpieces are carried by an elongated bed disposed in operating relationship with two movable spindle head units which rotatably support appropriate cutters. The workpieces are received on a conveyor mounted on top of one end of the bed and move along the conveyor into position to be engaged by an axially movable pin carried by the first spindle head unit. The pin is actuated automatically to enter an opening formed in the workpiece upon the completion of a cutting stroke by the spindle head units. Thereupon the spindle head unit is initiated in its return movement, pulling the workpiece with it into the first of two clamping mechanisms. The pin serves to accurately position the workpiece in the clamping mechanism relative to the cutter, and as the spindle head unit arrives at the end of its return movement, it trips a switch which causes the clamping mechanism to be actuated and securely clamp the workpiece in position so that it may be operated upon by the cutter, and the pin is withdrawn from the workpiece. The spindle head unit is then initiated in its cutting movement to effect a machining operation on the workpiece. Upon completion of the machining operation the first of two automatically actuated pins carried by the second spindle head unit engages the opening in the workpiece, and as the second spindle head unit travels in its return movement it pulls the workpiece with it into a second clamping mechanism. In the meantime the first spindle head unit is moving a new workpiece from the receiving conveyor into the first clamping mechanism.

After both workpieces are positioned in the clamping mechanisms, the latter are actuated to secure the workpieces and the cutting stroke of the spindle heads is again initiated. Upon completion of such cutting operations, the clamping mechanisms are automatically released to free the workpieces, and the second, of the two pins carried by the second spindle head unit, is actuated to engage the opening in the workpiece disposed in the second clamping mechanism. As the spindle head units initiate their return movement, the second unit pulls the workpiece from the second clamping mechanism onto a discharge conveyor which carries the finished workpiece from the machine. At the same time, the second spindle head unit is also transferring a workpiece from the first clamping mechanism to the second clamping mechanism and the first spindle head unit is transferring a workpiece from the receiving conveyor to the first clamping mechanism as previously described. In this manner, three workpieces are transferred simultaneously to their respective succeeding stations by the two spindle head units as they are traveling in their return movement after completing a cutting stroke.

The foregoing and other objects of this invention will become more fully apparent from the following detailed description, and may be achieved by the exemplifying apparatus depicted in and further described in detail in connection with the accompanying drawings, in which.

Figure 1:
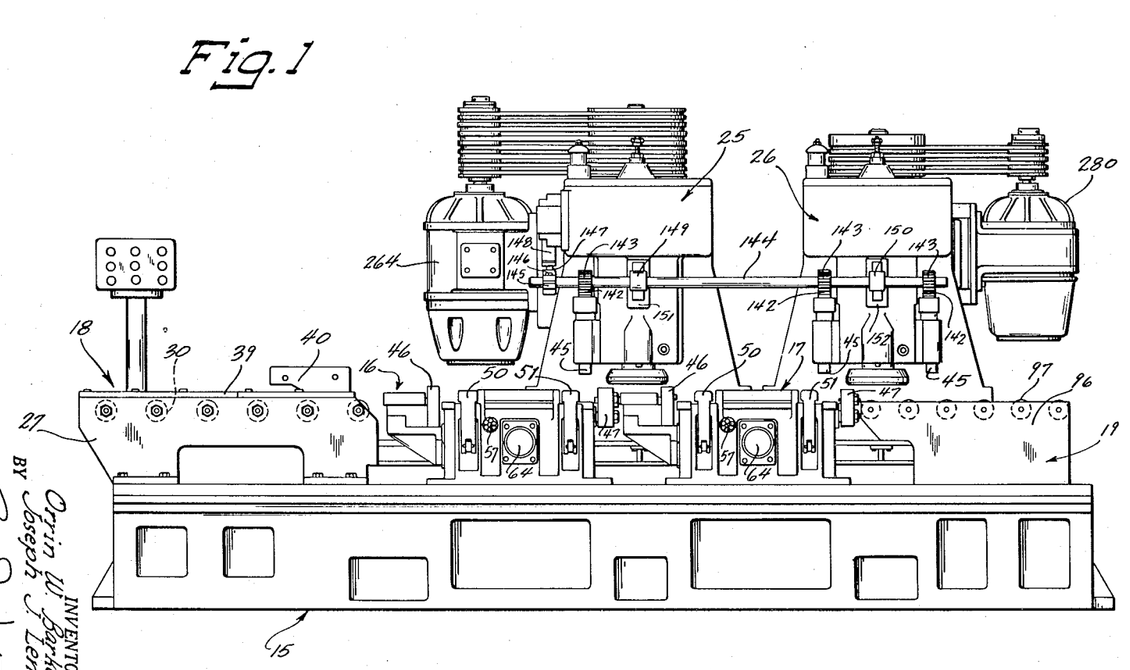
Figure 1 is a view in front elevation of a milling machine embodying the features of the present invention.
Figures 2, 11:
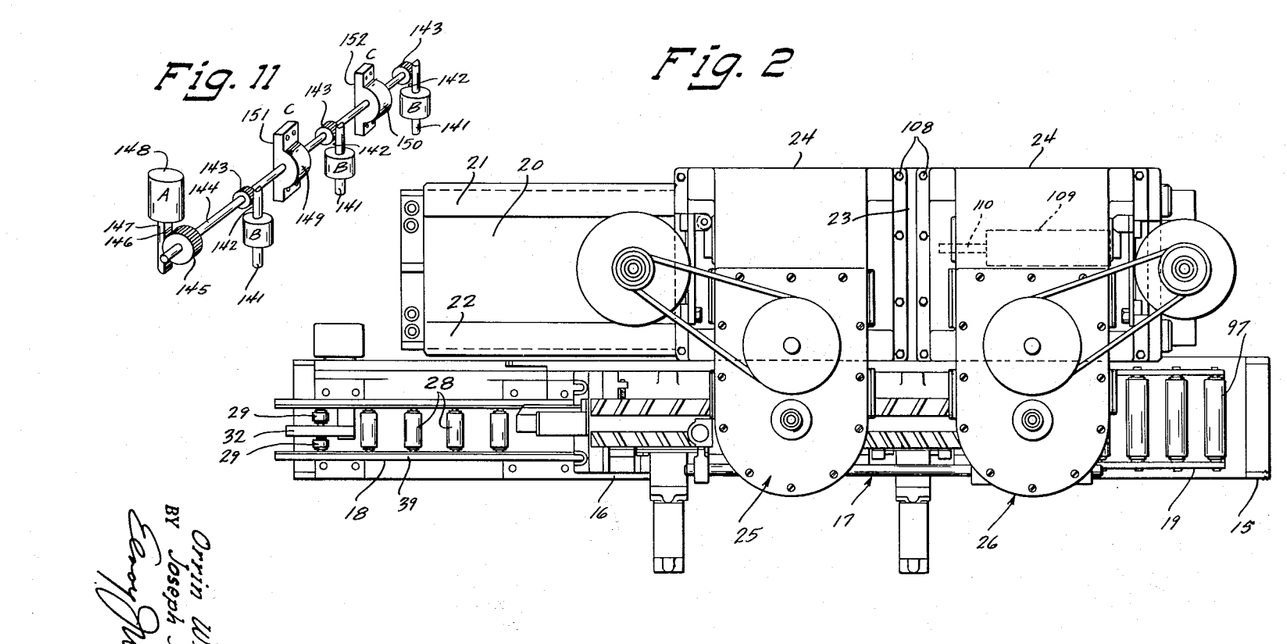
Fig. 2 is a plan view of the machine illustrated in Fig. 1.
Fig. 11 is a schematic representation of the transfer pin actuating mechanism to provide a clearer view thereof.

Referring more specifically to the drawing and particularly to Figs. 1 and 2 thereof, the invention is shown embodied in a milling machine comprising, in general, a main frame or bed 15 rigidly supporting a pair of clamping units 16 and 17 located in juxtaposition on the central portion of the bed. The clamping units 16 and 17 are disposed between two conveyors 18 and 19 mounted on either end of the bed 15, for carrying the workpieces to and from the clamping units. The conveyor 18 serves to receive the workpieces to be operated upon and move them into position to be transferred to the clamping unit 16 where the first machining operation is performed. The completed workpieces are transferred in a manner to be described from the clamping unit 17 to the conveyor 19 which functions to discharge them from the machine.

Adjacent to the main bed and permanently secured thereto in parallel relationship is a secondary bed 20 upon which are formed a pair of integral ways 21 and 22 for slidably supporting a saddle 23 with platforms 24 secured thereon which carry a pair of spindle head units 25 and 26 that are utilized for moving the workpieces and effecting the cutting operation, as will be later described.

Figure 8:
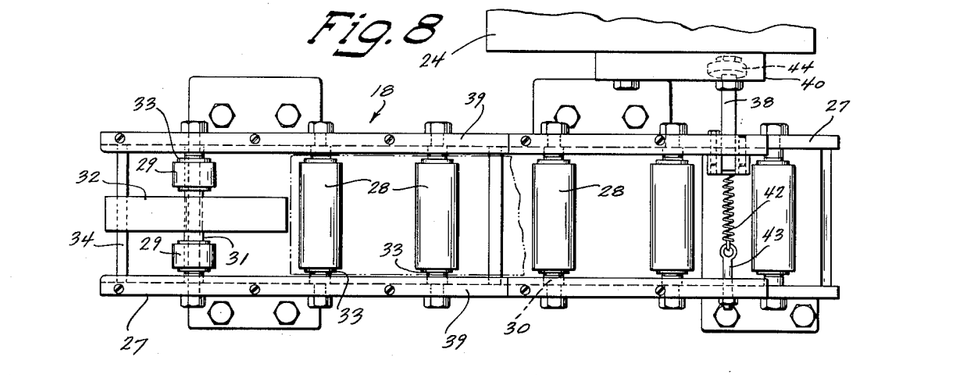
Fig. 8 is a plan view of the conveyor unit shown on the left end of the machine bed in Fig. 1, illustrating its detent tripping mechanism.
Figure 9:
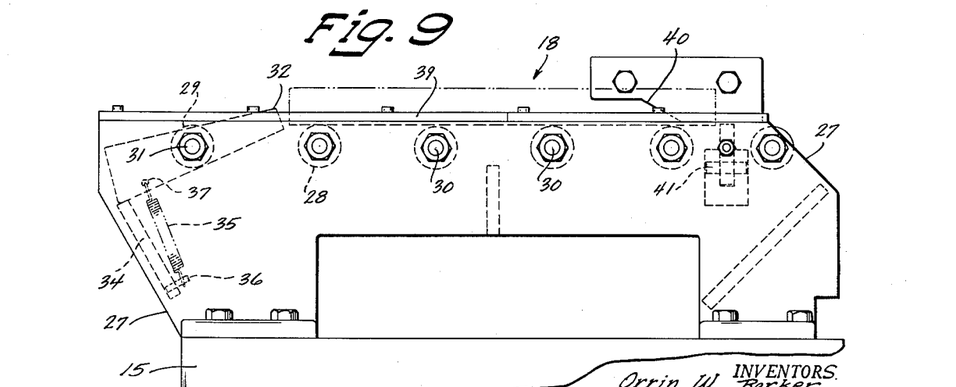
Fig. 9 is a view in front elevation of the conveyor unit depicted in Fig. 8.
Figure 10:
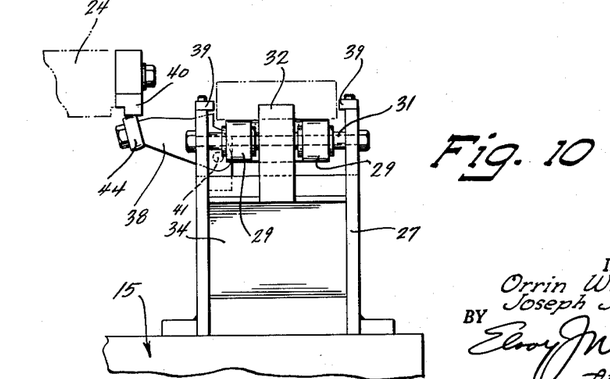
Fig. 10 is a view in left side elevation of the conveyor unit depicted in Fig. 9, clearly illustrating its detent and detent tripping mechanism.

The conveyor unit 18 includes a conveyor frame 27 to which rollers 28 and short rollers 29 are mounted by means of roller shafts 30 and short roller shaft 31, respectively, and spaced apart so that the workpiece can be moved along the conveyor with each roller successively taking up the load. The short rollers 29 straddle a spring tensioned detent 32 which pivots about short roller shaft 31. A spacer 33 keeps the rollers spaced from the frame 27. The detent 32 is limited in its counterclockwise movement by a cross strut 34 and in its clockwise movement by a detent spring 35 anchored to the strut 34 by means of a pin 36 and hooked onto the detent 32 through opening 37 therein. The workpieces passing over the detent will depress it, and the detent spring 35 will return it to its normal position after the workpiece has passed, thereby preventing the workpiece from backing up.

At the opposite end of the conveyor 18 is a spring actuated stop 38 which stops the forward movement of the workpiece to control the workpieces admitted into the machine. Lateral movements of the workpieces are limited by longitudinal guide bars 39.

Upon being stopped at the forward spring actuated stop 38, the workpiece remains in this position until the stop 38 is depressed by a cam 40 mounted on the saddle 23 and uging it downward when the saddle reaches the end of the cutting stroke, thus clearing the path for movement of the workpiece to its next succeeding station.

The stop 38 is pivoted about a pin 41 and urged into position by a spring 42 hooked onto an eye bolt 43 attached to the conveyor frame 27, so that whenever the cam 40 is not in contact with a roller 44 in Fig. 10, the spring 42 retains the stop 38 in its normal position to prevent the forward movement of any workpiece.

The workpiece upon being stopped by the forward stops is maintained in a properly aligned position by the longitudinal guide bars 39 and the stop 38 for receiving a transfer pin 45 carried by the spindle head unit 25, the transfer pin being movable axially to enter a suitable opening (not shown) formed in the workpiece. Thus the transfer pin 45 serves to attach the workpiece to the spindle head unit 25, and as the latter moves in its return stroke after completing a cutting operation it pulls the workpiece with it to its next station.

In this manner the workpiece is transferred from the conveyor 18 to the clamping unit 16 and then on its next movement into the similar clamping unit 17, both being secured to the bed 15 by any well known means, such as bolts or welding. These clamping units serve to hold the workpieces in place during the machining process. Inasmuch as both clamping units 16 and 17 are identical, the operation of only one will be described.

Figure 4:
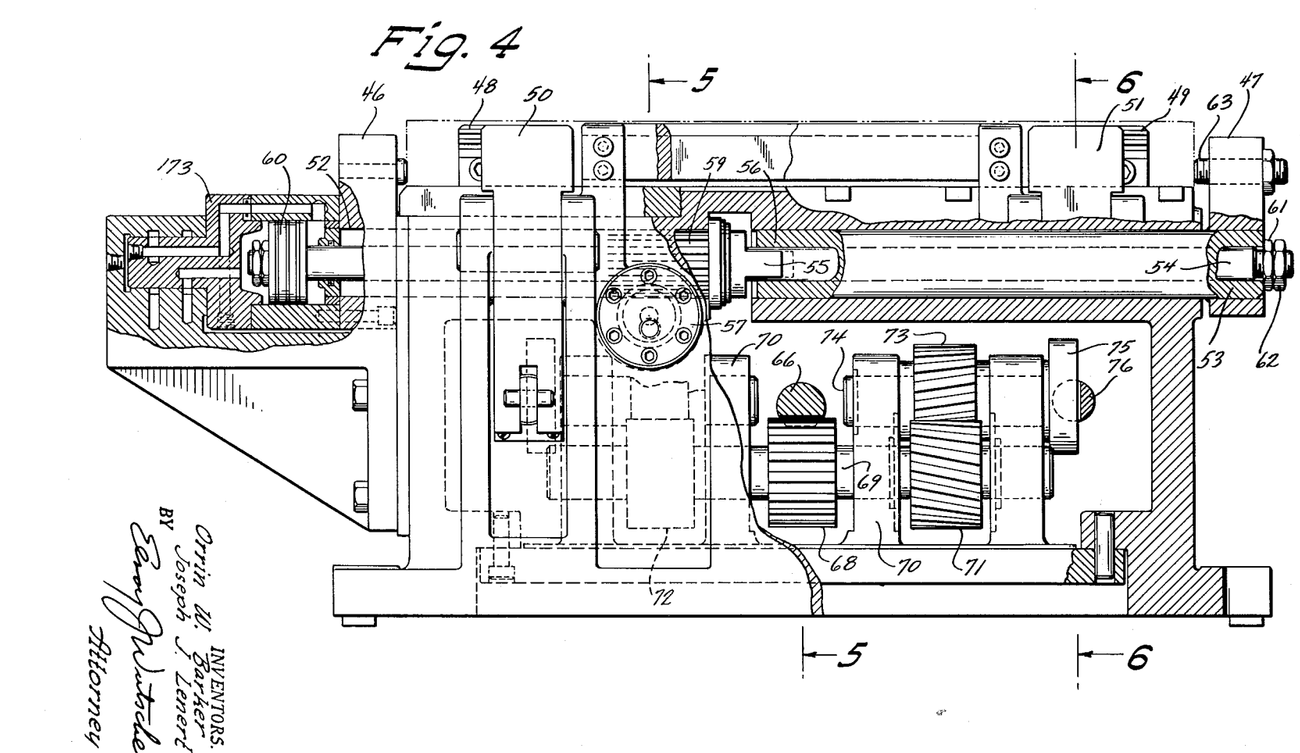
Fig. 4 is an enlarged detail view in front elevation of a clamping unit with portions broken away to reveal the internal structure.
Figure 5:
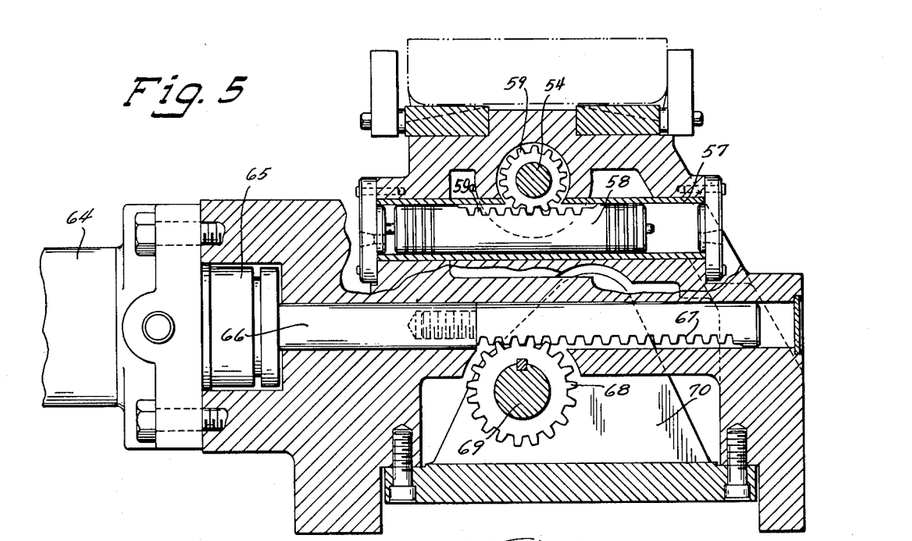
Fig. 5 is a view in vertical section, taken along the line 5—5 of Fig. 4.
Figure 6:
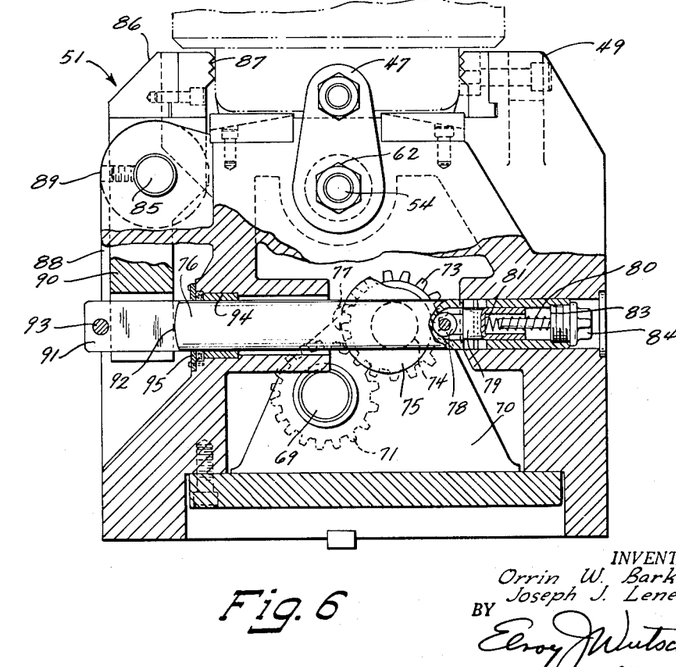
Fig. 6 is a view in vertical section taken along the line 6—6 of Fig. 4.

Referring to Figs. 4, 5, and 6, it can be seen that the workpiece is held in place by end clamps 46 and 47 and side clamps 48, 49, 50 and 51, and of these clamps, 46, 47, 50 and 51 are movable and are used to apply the clamping force to the workpiece while the other clamps are stationary. Clamps 46 and 47 are pivotal laterally to permit the passage of the workpieces by pivoting the clamps 46 and 47 out of the way.

Clamp 46 is welded onto a sleeve 52 and clamp 47 is welded to a sleeve 53, whereby all pivotal movements of these clamps are controlled by the sleeves which are slidably and rotatably mounted on a piston rod 54, and transmit motion to each other through cooperating clutch teeth 55 and 56. This type of connection allows limited longitudinal movement of the sleeves while remaining in contact with each other thereby permitting one sleeve to move the other sleeve around the piston rod 54.

In Fig. 5, there is shown a hydraulic actuating mechanism for rotating the sleeves 52 and 53 to pivot the end clamps 46 and 47 clear of the path of the workpiece. A hydraulic cylinder 57, with a double pistoned rod 58 within, is the original source of the rotational force to the sleeves 52 and 53. The sleeve 52 has a gear 59 secured thereto at one end disposed to mesh with a gear rack 60 formed on the piston rod 58, so that any movement of the piston rod 58 within the hydraulic cylinder 57 will pivot the clamps 46 and 47 into or out of position.

In Fig. 4 it can be seen that end clamping pressure is exerted by means of the piston rod 54 secured to a piston 60 and clamp 47 with nuts 61 and 62, respectively. Thus, whenever the piston 60 is moved by hydraulic pressure in either direction, a longitudinal movement of the end clamp 47 towards or away from end clamp 46 will occur so that an endwise or a release of clamping pressure from the end clamp 47 through an adjustable button 63 will occur.

Side clamping pressure is likewise exerted by the use of the four side clamps 48, 49, 50 and 51. Of these side clamps, 48 and 49 remain stationary while 50 and 51 are movable to urge the workpiece against the stationary clamps, thereby exerting a gripping pressure upon it.

The side clamps are hydraulically actuated by means of fluid from hydraulic cylinder 64. A piston 65 within the cylinder 64 is connected to a piston rod 66 having a gear rack 67 formed thereon for coaction with a spur gear 68 keyed to a shaft 69 to turn the shaft by converting rectilinear motion of the piston rod 66 to a curvilinear or an angular motion of the shaft 69. The shaft 69 which is mounted in a frame 70 also carries spiral gears 71 and 72 thereon and will transmit power through another gear system to the side clamps. Inasmuch as the gear systems contiguous to spiral gears 71 and 72 are the same, only that system receiving power from spiral gear 71 will be described in detail.

A spiral gear 73 mounted on a shaft 74, is intermeshed with the spiral gear 71 for rotating a cam 75 which is also fitted into a slot in a rod 76 where intimate contact is kept between the cam 75 and a rod surface 77 by means of a roller 78 mounted on a plunger 79. A spring 80 compressed between a shoulder 81 of the plunger 79, and a face 83 of a tension adjusting nut 84 threaded on the end of the rod 76, urges the roller 78 against the surface of the cam 75 and with the cam as a base, the spring urges the rod 76 to move outwardly so that the rod surface 77 is kept in constant contact with the cam surface. Any change in the cam's surface distance from its axis in the cam shaft 74 will be reflected in a varying linear movement of the rod 76. Such linear movement will vary directly with the distance of the cam surface from the axis of the cam shaft 74.

It is to be noted that upon contact with the workpiece by either clamps 50 and 51 the movement of its driving cam 75 will stop and the spiral driving gear 73 along with its shaft 74 will drift towards the other clamp until that clamp also contacts the workpiece whereupon both clamps will exert a simultaneous clamping pressure.

The movement of the rod 76 is reflected in the clamp 51 which is pivoted about a pin 85, along with its components, a jaw 86 and its serrated insert 87. Fixed to the lower end of the clamp 51 is a fork 90 which fits over a tongued end 91 of the rod 76 and abuts a curved surface 92 of the rod 76 with the tongued end kept within the forked end by a pin 93. In this condition any movement of the rod 76 slidably mounted in a suitable bushing 94 and protruding out of a cover plate 95 will be transmitted to the clamp.

A duplicate clamping assembly unit 17 comprising the same elements is attached to the bed 15 adjacent to the clamping assembly 16. Inasmuch as the parts and the means of cooperation are identical with the clamping unit 16 described above, a detailed description is omitted.

Figure 7:
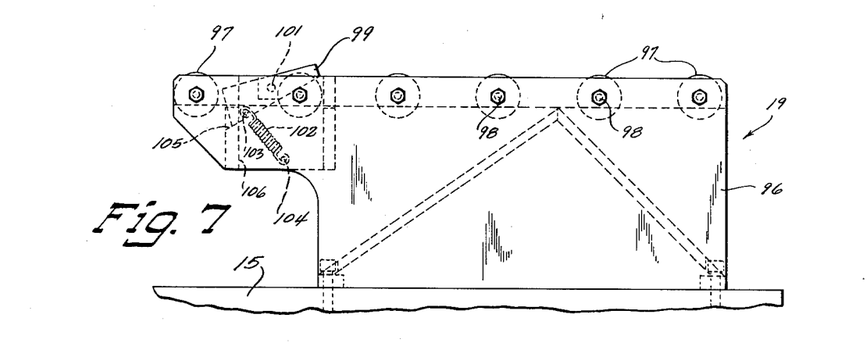
Fig. 7 is a view in front elevation of the conveyor unit shown on the right end of the machine bed in Fig. 1.

Adjacent the clamping assembly 17, is a conveyor unit 19 for removing the workpiece from the milling machine comprised of a conveyor frame 96 (Fig. 7), on which rollers 97 mounted on suitable bearings and carried upon roller shafts 98 are fitted. A spring tensioned detent 99 is used to prevent the workpiece from backing up. It is pivoted about a cross bar 101 and kept in position by a spring 102 which is attached to the detent 99 by a pin 103 and to the conveyor frame by a cross pin 104. The movement of the detent is limited by a shoulder 105 of a cross strut 106 from rotating in a counterclockwise direction and by the tension of the spring in a clockwise movement. The detent is depressed by the workpiece as it passes over it and is returned to its normal position after the workpiece clears it, thereby preventing the workpiece from backing up.

Secured to the main frame or bed by means of bolts or welding, is the secondary frame or bed 20 with the ways 21 and 22 formed thereon. The saddle 23 is made of a metal plate or casting, with an under surface machined to ride upon ways 21 and 22, and has secured thereon, platforms 24, by means of bolts 108, for simultaneous movement. As shown in Fig. 2, the saddle is moved by means of a hydraulic feed cylinder 109 secured to the secondary frame or bed 20, and a piston rod 110 secured to the underside of the saddle 23. Thus, any movement of the piston within the hydraulic cylinder 109 will be transferred to the saddle 23 via piston rod 110, causing it to slide along ways 21 and 22. The saddle supports the spindle head units 25 and 26 of which unit 25 will be described, inasmuch as both units are basically identical.

Figure 3:
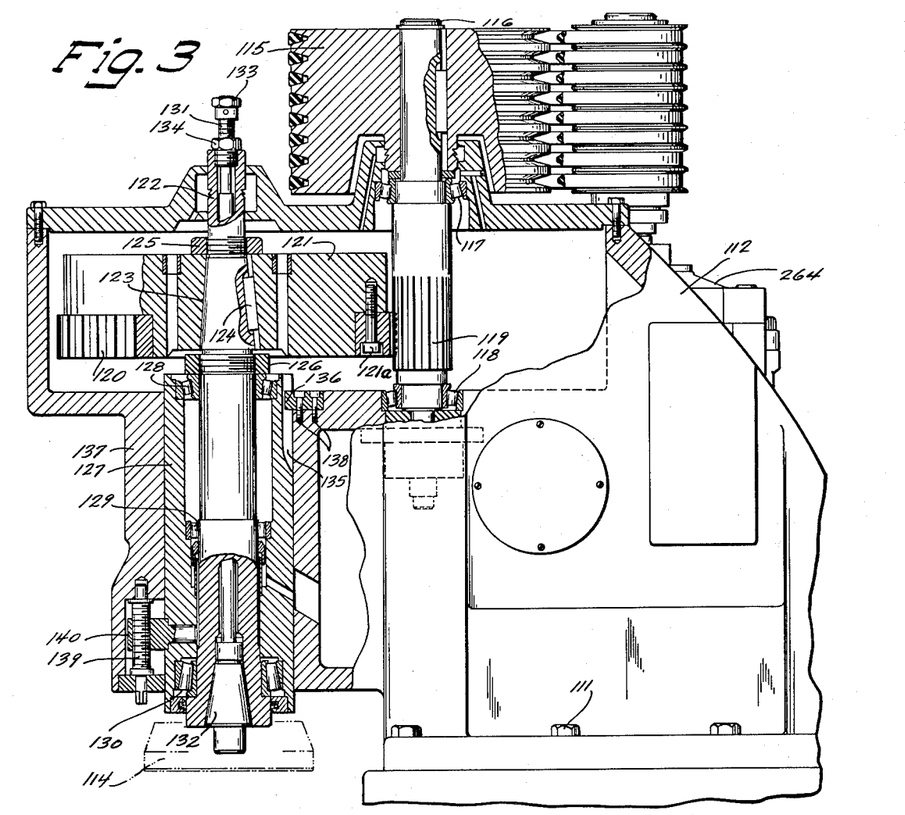
Fig. 3 is an enlarged view in side elevation of a spindle head unit with parts broken away to show its internal mechanism.

As best seen in Fig. 3 the spindle head unit 25 is secured to the platform 24 mounted on the saddle 23 by means of bolts 111. A frame 112 supports an electric motor, a cutter 114, etc. The electric motor may be of any conventional type used to drive the cutter by means of an eight groove V-belt sheave 115 keyed to a shaft 116 journalled in the frame 112 by means of roller bearings 117 and 118, permitting the shaft to rotate freely. Power is transmitted from the drive shaft 116 to the cutter 114 by means of a gear 119, formed on the drive shaft, engaging a gear ring 120 attached to a flywheel 121 by a series of bolts 122 circumferentially spaced about the flywheel. The flywheel 121 is mounted on a vertical spindle 122 and supported thereon by a tapered section 123, being prevented from rotating relative to the spindle by means of a key 124 and is fixed thereto by a collar nut 125. Another collar nut 126 serves to retain the spindle 122 within a quill 127 with the spindle 122 being rotatably supported therein on roller bearings 128, 129 and 130. The vertical spindle 122 has an arbor draw bolt 131 fitted therein with proper clearance which is to be used to draw up an arbor 132 by the use of an arbor draw bolt head 133.

The arbor draw bolt 131 can be locked by tightening the arbor draw bolt nut 134.

A slot 135 is provided in the quill 127 and has a quill key 136 fitted therein which is attached to a cylinder body 137 by means of machine screws 138, thereby permitting vertical movement and preventing rotational movement of the quill. The quill can be moved up or down within the cylinder by a quill adjusting screw 139 mounted in the cylinder body 137 for free rotation. A quill adjusting nut 140 has threaded engagement with the quill adjusting screw 139 having its free end inserted into an opening in the quill whereupon turning of the quill adjusting screw, will move the quill adjusting nut 140 up or down, causing a similar movement of the quill 127.

In moving the workpieces from station to station an element is inserted into each workpiece. This element is known as the transfer pin 45 which fits into the workpieces and is used to pull and locate the workpieces in their successive stations. The number of transfer pins may vary according to the number of workpieces desired to be moved or to be machined. The transfer pins are all moved simultaneously and are best depicted schematically in Fig. 11 and as attached to the milling machine in Fig. 1. It will be seen that spindle head units 25 and 26 have the hydraulically actuated pins attached thereto with each pin 45 having formed on its pin shaft 141 a gear rack 142 which intermesh with corresponding spur gears 143 mounted on a rod 144 for simultaneous operation when actuated by a spur gear 145 which is rotated by an actuating gear rack 146 as a piston shaft 147 is actuated by a hydraulic cylinder 148 attached to the spindle head unit. The rod 144 is supported on the spindle head units 25 and 26 by bearings 149 and 150 mounted on plates 151 and 152 which are secured to the spindle head units in a standard manner. Thus it can be seen that uniform and simultaneous action can be imparted to each of the transfer pins through the hydraulically actuated rod 144.

Figure 12:
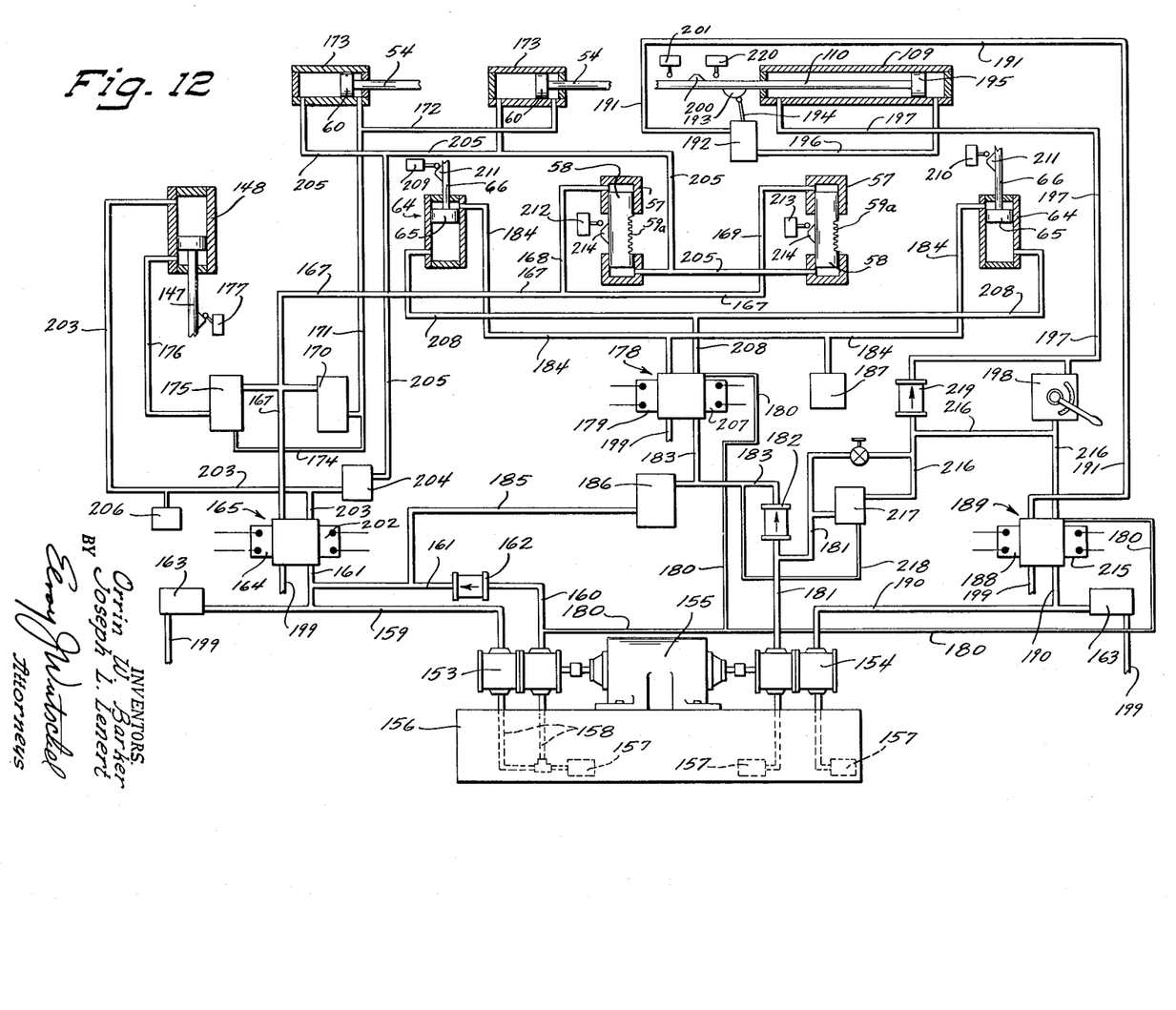
Fig. 12 is a diagrammatic view illustrating the hydraulic circuit.

All clamping of the clamping units and movements of the table 23 are the results of hydraulic pressure being applied to various hydraulic cylinders which actuate the movements. The oil pressure in the circuit is maintained by two double pumps 153 and 154 driven by an electric motor 155. The hydraulic circuit shown in Fig. 12 will be described as follows:

An operator, upon starting a machining cycle, energizes the electric motor 155, driving the pumps to build up pressure within the circuit. Oil is drawn from an oil reservoir 156 through oil filters 157 and intake pipes 158 into the double pump 153 from where the fluid is pumped into the circuit under pressure. The fluid leaves pump 153 through a pair of oil lines 159 and 160, both of which communicate with a line 161. Meanwhile, the fluid in the oil line 160 passes through a check valve 162 and then branches to a relief valve 163, and into other lines which will be subsequently described.

A solenoid 164 of a solenoid valve 165 is energized by depressing a cycle start button 166, permitting the fluid to pass from the line 161 to a line 167 and thence into lines 168 and 169, actuating the double ended piston rods 59 within the hydraulic cylinders 58, and causing the end locating stops 46 and 47 to be rotated into their normal clamping position by the rack 60 and the pinion 59. See Figs. 4 and 5.

After the end locating stops 46 and 47 are in position, the pressure of the fluid increases until it reaches a predetermined pressure in a sequence and check valve 170, whereupon the fluid is passed through the check valve into oil lines 171 and 172 and into the end hydraulic cylinders 173 which actuate the end clamping mechanisms to hold the workpieces endwise by means of the end locating stops 47, through the use of the piston 60 and the piston rod 54, as shown in Figs. 4 and 5.

Some fluid from oil line 171 passes into a pilot line 174 to actuate a sequence and pressure check valve 175, letting the fluid from the line 167 pass through to an oil line 176 leading into the transfer pin hydraulic cylinder 148 in which the piston shaft 147 is moved, giving a rotational movement to the rod 144 which in turn moves all of the transfer pins 45 simultaneously out of engagement with the workpieces.

As the transfer pin 45 is being moved out of the workpiece, a limit switch 177 is tripped by a cam on the piston shaft 147 energizing a solenoid valve 178 whereby a solenoid 179 is energized and moves an internal valve, not shown, thus allowing the fluid pressure from a pilot line 180 to move a main valve within the solenoid valve, thereby permitting the fluid to pass in series from an oil line 181 through a check valve 182, through an oil line 183 into an oil line 184 and then into the side clamp hydraulic cylinders 64. Thus, with the aid of fluid pressure coming from the oil line 161 through an oil line 185 and a sequence and check valve 186 which permits fluid flow after the pressure of the fluid has exceeded a set pressure therein, a final clamping pressure is introduced into the side clamp hydraulic cylinders 64 via the oil line 184.

A pressure switch 187 operatively connected to the oil line 184 will cause a solenoid 188 of solenoid valve 189 to become energized when a previously determined pressure is reached within the oil line 184. The energized solenoid 188 will move a pilot valve within the solenoid valve 189 so that the fluid from the pilot line 180 can move the main internal valve (not shown) within the solenoid valve 189 thereby allowing the fluid pumped from the reservoir 156 by means of the pump 154 to pass from an oil line 190 through the solenoid valve 189 into an oil line 191.

The oil flows through oil line 191 to a cam operated valve 192. This valve controls the flow of the exhaust fluid from the feed cylinder 109 on the return stroke of the spindle head units when a cam 193 on the piston rod 110 depresses a valve plunger 194 on the valve 192 which restricts an inlet part of the valve, and causes the fluid to cushion the feed means near the end of its return stroke by acting as a dash pot. The inlet port of the valve 192 is restricted only when it is receiving exhaust fluid from the feed cylinder 109, but does not interfere with the pressure flow into the cylinder for driving a piston 195.

After leaving the cam operated valve 192, the fluid passes into an oil line 196 and into the cylinder 109, causing its piston rod 110 to move outwardly to force the fluid on the other side of the feed piston 195 into an oil line 197 through a metering control valve 198, through the solenoid valve 189 and into the reservoir 156 via a return line 199.

The metering control valve 198 controls the rate of feed by controlling the flow of fluid passing through it by varying the size of a restrictable opening within the valve.

When the saddle 23 is moved to its limit by the piston rod 110 of the feed hydraulic cylinder 109 a cam 200 fixed to the piston rod trips a limit switch 201 which closes an electric circuit subsequently described, so that the solenoid valve 189 is deenergized and a solenoid 202 of the solenoid valve 165 is energized, causing the fluid to flow from the oil line 161 into an oil line 203 to the transfer pin hydraulic cylinder 148 which in turn causes the lowering of the transfer pins 45 into the holes in the workpieces for transferring them to the next stations. When the pins are in place, the fluid pressure in the line 203 builds up until the fluid is passed through a sequence and check valve 204 into an oil line 205 to be conducted to the end hydraulic cylinders 173 where the pressure is exerted on the opposite piston surface resulting in a movement of the piston rods 54 which releases the end clamping pressure. Oil line 205 also leads into the hydraulic cylinders 57 which in similar actions pivot the end clamps 46 and 47 to clear the path of the workpiece.

Meanwhile, a pressure switch 206 is actuated when the fluid pressure in the line 203 reaches a predetermined amount whereby an electric circuit is closed which causes solenoid 207 of the solenoid valve 178 to become energized to move its internal pilot valve in a way previously described, so that fluid flows from the line 183 through a line 208 and into the side clamp hydraulic cylinders 64 to release the side clamps 50 and 51.

The freeing of the side clamps and the lateral rotation of the end clamps 46 and 47 providing clearance for the workpiece, results in the closing of a pair of limit switches 209, and 210 by a cam 211 on the piston rods 66 of the side clamp hydraulic cylinders 64 and the closing of limit switches 212 and 213 by a cam 214 on each of the double pistons 58. Upon the closing of these limit switches, a solenoid 215 of the solenoid valve 189 is energized, causing an opening of the solenoid valve 189 to an oil line 216 leading into the feed hydraulic cylinder 109, whereby the fluid pressure acting on the hydraulic feed cylinder will cause the return of the table 23 to its starting position. The movement of the table to its starting position is made in rapid traverse by means of increasing the volume of fluid acting on the rod end of the piston 195 through the use of a sequence and check valve 217. The sequence and check valve 217 is actuated by pressure from the line 183, the valve having communication therewith through a pilot line 218. When the pressure in the pilot line 218 reaches a predetermined value, it functions to actuate the valve 217 and thereby permits the fluid from the line 181 to flow through the valve and into the line 216 through the check valve 219 and into the line 197 which transmits it to the rod end of the cylinder 109, as shown in Fig. 12 to force the piston 195 to the right in its return movement in rapid traverse.

The piston rod 110 of the hydraulic feed cylinder has cams 193 and 200 which come into contact with the plunger 194 of the valve 192 and a limit switch 220 respectively. When the piston rod 110 nears the end of its return stroke, the cam 193, thereon, depresses the plunger 194 which gradually decreases the area of the opening in the valve 192 causing the oil to build up a back pressure in oil line 196 and in the hydraulic cylinder and act as a cushion while the limit switch 220 tripped by the cam 200 causes the deenergization of the solenoid 215 to complete the cycle.

In relief valves 163, solenoid valves 165, 178 and 179, the oil lines 199 lead back into the oil reservoir 156 as the drain lines.

Figure 13:
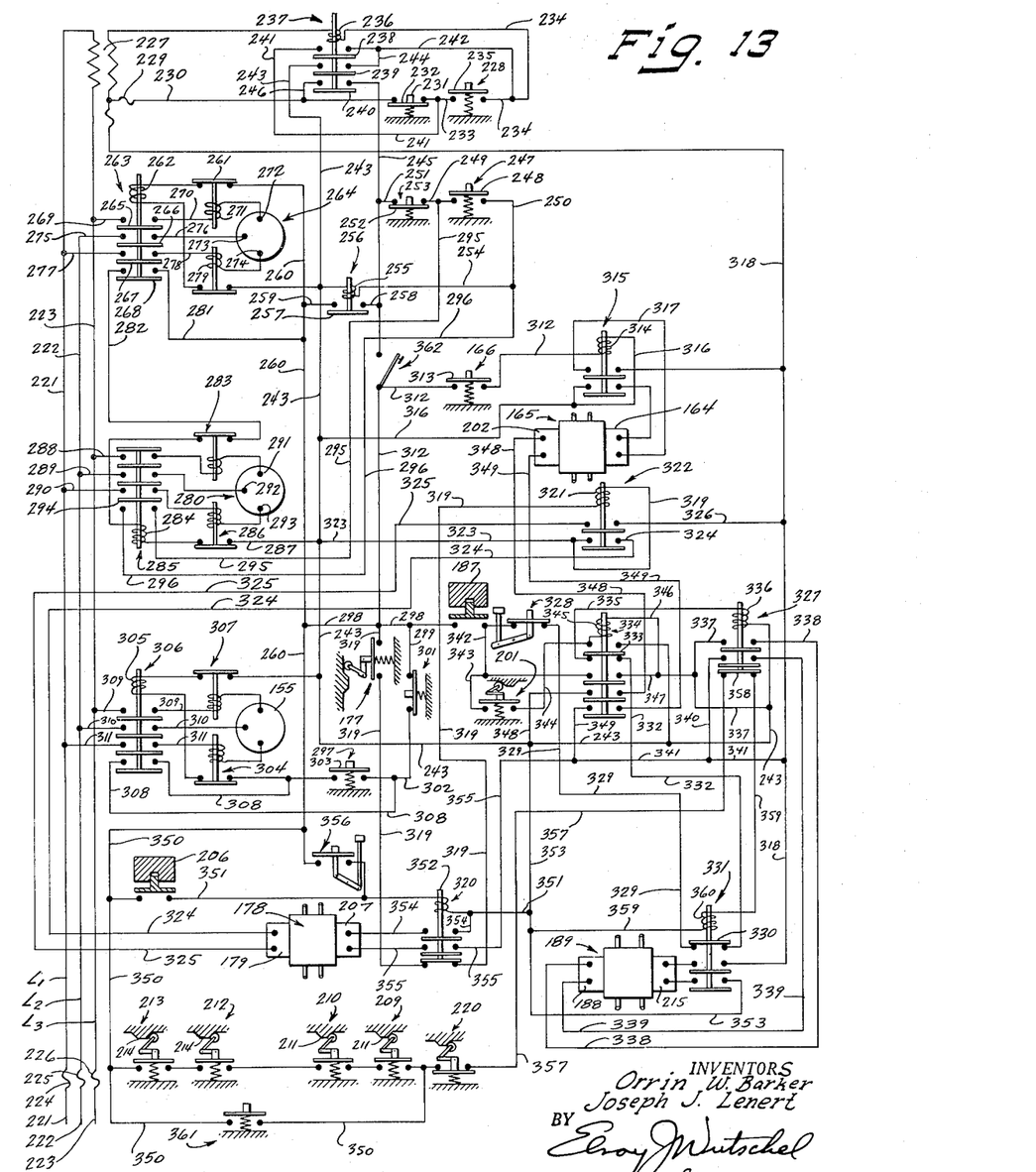
Fig. 13 is a schematic representation of the electrical circuit of the machine.

Referring to the electrical circuit in Fig. 13 for a description of the electrical control circuit of the invention, leads 221, 222 and 223 from a power source have fuses 224, 225 and 226 to protect the circuit from overloads. Leads 221 and 223 terminate in the primary coils of a transformer 227 while all three leads conduct power to motors subsequently shown.

The power to operate the hydraulic pumps and the spindles comes from a primary circuit identified by leads 221, 222 and 223, but the power to control the solenoid valves, switches, cutouts, etc., comes from a secondary or control circuit complete in itself and receiving its power from the transformer 227.

The operation of the machine is begun by depressing a master start button 228, allowing energy to flow from the transformer 227, to pass through a fuse 229, through a lead 230 and a master stop switch 231, via a contact bar 232, through conductor 233 into the master start switch 228 to a conductor 234 by means of a bridge provided by a contact bar 235. Only a momentary depression of the master start button 228 is needed for power to be transmitted through it into the conductor 234 to energize solenoid 236 of a relay 237 whereupon contact bars 238, 239 and 240 close and keep closed the open circuits in the relay 237, to be described later, and passes on to the transformer 227.

Upon the contact bar 238 closing its respective circuit, the solenoid 237 receives electrical energy from the by-pass conductors 241, through the contact bar 238 through a conductor 242 to the conductor 234 so that upon releasing of the master start button, causing the original circuit to be opened, the by-pass circuit will keep the solenoid 236 energized and the relay 237 closed. If necessary the relay 237, can be opened by breaking the circuit by depressing the master stop switch 231, thereby deenergizing the solenoid 236.

With the relay 237 closed, power is supplied to a conductor 243 by means of a conductor 244 through the contact bar 239 to the conductor 243 and to a conductor 245 by means of a conductor 246 via the contact bar 240 to the conductor 245. Thus, whenever it is desired to start the spindle motor, a spindle motor start button 247 is depressed, bringing the contact bar 248 into contact with the terminals of the conductors 249 and 250, creating a closed circuit from the conductor 245 through a conductor 251 via a contact bar 252 of a spindle motor stop button 253. A conductor 254 completes the circuit by allowing the current to pass through a solenoid 255 of a spindle relay 256 and to the conductor 243, causing the relay to become energized.

The spindle relay 256 brings a contact bar 257 in contact with the terminals of conductors 258 and 259 so that electricity will flow from the conductor 245 to a conductor 260 through an overload relay 261 to a solenoid 262 of a motor relay 263 energizing it, whereupon the motor relay 263 closes, thus starting a motor 264 when contact bars 265, 266, 267 and 268 come in contact with the terminals to complete the various circuits. The conductor 223 supplies the power through conductors 269 and 270 to a solenoid 271 of the overload relay 263 to a terminal 272 of the motor 264 while the conductors 221 and 222 simultaneously furnish power to the motor terminals 273 and 274 via conductors 275, 276, 277, 278 and overload relay solenoid 279, respectively, to start the motor 264.

Upon starting the motor 264, other circuits are closed so that a motor 280 is started almost simultaneously with the motor 264. The contact bar 267 completes a circuit which permits electricity to flow from the conductor 245 through the conductor 258, the contact bar 257, the conductor 259 to the conductor 260 to conductors 281, 282 through an overload relay 283 through a motor relay solenoid 284, causing a motor relay 285 to close and through an overload relay 286 to a conductor 287 and to the line 243.

It can be readily seen that the motor 280 receives its power from the lines 221, 222 and 223 by the conductors 288, 289 and 290, to terminals 291, 292 and 293 of the motor.

A contact bar 294 closed by the motor relay 285 completes a by-pass or a holding circuit which furnishes the electricity to the relays after the motor start button 247 is released. The circuit now passes through conductor 295 through the closed contact bar 294 through conductor 296 to conductor 254 leading through the solenoid 255 of the relay 256 to the conductor 243 thus completing the holding circuit.

A motor stop button 253 can break the circuit so that the motor start button 247 will have to be depressed again to restart the motors 264 and 280.

The hydraulic pump motor 155 is started by depressing a pump start button 297 to close a circuit originating from the conductor 245 passing through the conductor 258 and the relay 256 which is closed, as previously described, through the conductor 259 to the conductor 260, branching off into a conductor 298 and then through a conductor 299 and a pump motor stop 301, into the conductor 302 through a contact bar 303, an overload relay 304, a solenoid 305 of a pump relay 306, through on overload relay 307 to the conductor 243.

The solenoid 305 being energized causes the relay 306 to close, thereby closing the circuits to the motor 155 and a by-pass or holding circuit 308 around the hydraulic pump motor start button 297 so that a continuous flow of energy will be provided, until the circuit is opened.

As previously mentioned, the closing of the relay 306 as above, will permit electrical current to flow from the lines 221, 222 and 223 to the terminals of the pump motor 155 via conductors 309, 310 and 311.

The overload relay, for example 307, in each of the motors, is a safety device to open the electrical circuit to the motors whenever the motors may become overheated or overloaded.

Each machining cycle is started by depressing the cycle start button 166. By closing the circuit with the cycle start button, electrical energy from the conductor 245 flows through the conductor 258, the closed relay 256, the conductors 259 and 260 to the conductor 298 and a conductor 312, through a contact bar 313 and a solenoid 314 of a relay 315 and via conductor 316 to the conductor 243.

The energized solenoid 314 causes the relay 315 to close and complete a circuit to the solenoid valve 165. There are two circuit breaks in the circuit, one on each side of the solenoid valve for added protection in case of a short circuit, whereby the solenoid will be kept from operating. The electricity flows from the conductor 316 through the relay 315 to a terminal of the solenoid valve 165 and back to the relay via a conductor 317 and to a conductor 318.

When the solenoid valve 165 is energized, it will permit fluid, coming from the oil pump in the oil line 161, to pass through into the oil line 167 and start the whole sequence of hydraulic operations described above. And, when the transfer pin 45 is moved out of the workpiece, a cam thereon trips the limit switch 177 to close a circuit which allows electrical current to flow from the conductor 245 through the conductors 258, 259 via the relay 256, through the conductor 260, 298, 319, via the limit switch 177 into a relay 320 which, during its inactivated condition, keeps the circuit conductor 319 closed, then continuing on through the conductor 319 to a solenoid 321 of a relay 322, energizing that relay and then through a conductor 323 leading to the conductor 243.

Upon the energization of the relay 322, the relay contact bars close and complete the circuits leading to and from the solenoid valve 178 which, after energization of its solenoid 179, allows fluid to flow through from the oil line 183 to the oil line 184 hydraulically actuating the side clamping mechanisms aforementioned. The flow of electricity is along a conductor 324 from the relay 322 passing through the solenoid 179, through the conductor 325 to the relay 322 and through a conductor 326 to the conductor 318.

When the side clamps are hydraulically moved against the workpiece, the oil pressure increases within the fluid line until it operates the pressure switch 187 to close a circuit, thereby energizing a relay 327. This circuit will now receive electrical energy from the conductor 245 along the conductors 258 and 259 via the relay 256, through the conductors 260 and 298 through the pressure switch 187, through a hand operated feed forward and stop switch 328, a switch which can be used to stop and start the feed mechanism during the cutting operation, then through a conductor 329, through a normally closed contact bar 330 of a relay 331, along a conductor 332, through a normally closed contact bar 333 of a relay 334, through a conductor 335 to a solenoid 336 of the relay 327 and to the conductor 243.

Relay 327, upon being energized, closes a circuit leading to the solenoid 188 of the solenoid valve 189 and actuates the valve so that fluid will pass into the feed hydraulic cylinder 109 from the oil line 190, to the oil line 191 to actuate the feed mechanism and permit the electrical current to flow from the conductor 243 to a conductor 337 across the relay 327 to a conductor 338, into the solenoid 188, returning to its source through a conductor 339, the relay 327 and through a conductor 340 to a conductor 341 to the return line conductor 318.

The feed mechanism moves the spindle head units in their cutting stroke, and when they approach the limit of their run, the cam 200 on the piston rod 110 of the feed mechanism, trips the limit switch 201 which causes the relay 334 to close, whereby the solenoid 189 is deenergized, causing the feed to stop and simultaneously energizes the solenoid 202 of the solenoid valve 165 so that the transfer pin 45 is dropped into place by the transfer pin hydraulic actuating cylinder 148 motivated by fluid from the oil line 203 as described above. Simultaneously, the fluid sequences through the valve 204 to release the end clamp hydraulic cylinders 173 from the clamping position and also causes the end clamps 46 and 47 to be moved out of position.

The electrical energy for this purpose comes from the conductor 245 via the conductors 258, 259, 260 and 298 through the pressure operated switch 187, conductors 342 and 343, and the limit switch 201, through a conductor 344, and a solenoid 345 of the relay 334, energizing and thereby closing that relay, out on a line 346, to a conductor 347 to the conductor 337 to the conductor 243. Energization of the relay 334 closes a by-pass circuit, by passing the limit switch 201 composed of conductors 343, 347 and 346 which then continues supplying electrical energy to the solenoid 345 upon the release of the limit switch 201, thereby keeping the relay closed.

The closing of the relay 334, as above shown, permits electrical energy to flow from the conductor 243 to a conductor 348, through the relay 334 and to the solenoid 202 of solenoid valve 165 via the conductor 348 and out of the solenoid 202 via conductor 349, through the relay 334 and to the conductor 341 to the conductor 318.

Upon release of the end clamps and their pivoting out of position, the oil pressure within the closed hydraulic circuit increases, thereby causing the pressure switch 206 to operate and close a circuit, whereby the solenoid 207 of the solenoid valve 178 is energized and moves its internal valve so that fluid from the pilot line can move the main internal valve (not shown), thereby allowing the fluid to pass into the oil line 208 leading to the side clamp hydraulic cylinders 64 which then effect the release of side clamps 50 and 51.

The electrical energy for this operation comes from the conductors 245, 258, 259, 260 and 350, through the closed hydraulically operated pressure switch 206 and continues through a conductor 351 to energize a solenoid 352 of the relay 320 and continues through a conductor 353 leading to the conductor 243. The closing of the relay 320 upon its energization, completes a circuit leading to the solenoid 207 of the solenoid valve 178 and starts a fluid cycle which releases the side clamps as above-mentioned. Energy to the solenoid 207 comes via a conductor 354, through the closed relay 320 to the solenoid 207, out through a conductor 355, via the relay 320 to the conductor 341 and then to the conductor 318.

A hand operated switch 356 may be used to by-pass the hydraulically operated pressure switch 206 to get the same results above-mentioned for workpiece set-up purposes.

When the side clamps 50 and 51 are released, cams 211 on elements of the hydraulic cylinders 64 contact and trip limit switches 209 and 210, while end stop clamps 46 and 47, upon being rotated out of position, trip limit switches 212 and 213 by means of cams 214 whereupon a circuit is completed, passing through the normally closed limit switch 220 via a conductor 357, through the deenergized relay 327, via a normally closed contact bar 358 to a conductor 359 to a solenoid 360 of the relay 331, energizing that relay, and out to the conductor 353 to the conductor 243. The energization of the relay 331 closes it and allows current to pass from the conductor 243 through the conductor 353 into the solenoid 215 out through a closed contact bar of relay 331 to the conductor 318 energizing the solenoid 215.

The energization of the solenoid 215 actuates an internal valve in the solenoid valve 189 so that the oil pressure in the pilot line 130 can move the main internal valve in the solenoid valve 189 into the oil line 216 to the feed hydraulic cylinder 109, causing the spindle head units to return to their starting position, whereupon the limit switch 220 is tripped open to break a circuit which deenergizes the solenoid 215 to complete the cycle. The machine is now in position to repeat another cycle which is done by pressing the cycle start button 166.

A switch 361 can be used to by-pass the limit switches so that the spindle head units can be returned to the start position at will. A switch 362 is provided for the purpose of moving the spindle head units while setting up the machine for operation.

The operation of the transfer machine is described briefly below, for a better understanding.

The workpieces are placed upon the conveyor unit 18 by some well known means, such as another conveyor. If another conveyor is used, the line of workpieces coming to the transfer machine will move the initial workpiece into the conveyor unit 18 of the machine. This workpiece will pass over the detent 32 by means of the rollers 28 and 29 of the unit until its forward movement is stopped by the second detent 38.

Two guide bars 39 will keep it in position while it passes through this conveyor unit. The guide bars 39 and the second detent 38 act as positioners and keep the workpiece in proper position to receive the transfer pin 45 as it is lowered from the spindle head unit 25 in the process of advancing the workpiece to the next station.

The spindle head units 25 and 26 carry the transfer mechanism which is lowered at the end of each cutting stroke, after the cam 40 carried by the platform 24 supporting the spindle head unit 25 trips the second detent 38 to release the workpiece for advancement to its next station. Transfer pins 45 are lowered into an opening of each workpiece and as the spindle head units 25 and 26 are returned to their initial position by rapid traverse, the workpieces are pulled along to their next station, which may be a clamping unit 16 or the last conveyor unit 19, depending on the stage in the operation.

After the workpiece is advanced to a succeeding station, the end positioning clamps 46 and 47 are returned to their vertical position. The workpieces are then clamped by their sides by means of the side clamps 50, 51, and by their ends by means of the end clamps 46, 47, so that they are rigidly secured and ready to be machined.

The cutter or cutters, depending upon the number of simultaneous cutting actions required, are advanced on the cutting stroke by means of the feed mechanism 109. Upon completion of the machining operation, the end clamps 46 and 47 are released and pivoted clear of the path of the workpiece while the side clamps 50 and 51 are released, thereby readying the transfer machine for another advancement of all workpieces.

The transfer pins 45 are again lowered into the various workpieces to be advanced into their succeeding stations. The cycle is repeated until the workpiece is passed through the milling machine, station by station, until all work is completed thereon, and the workpiece ends up on the transfer machine's conveyor unit to be discharged from the machine. Each cycle is started by depressing the cycle start button 166.

Without further analysis, the foregoing disclosure will so fully serve the gist of this invention that others can, by applying current knowledge, readily adapt it for various utilizations by retaining one or more of the features that, from the standpoint of prior art, fairly constitute essential characteristics of either the generic or specific aspects of the invention, and therefore, such adaptations should be, and are intended to be, comprehended within the meaning and the range of equivalency of the following claims.

Having thus revealed this invention, we claim as new and desire to secure the following combinations and elements, or equivalents thereof, by Letters Patent of the United States:

1. In a machine tool having a base and a frame movably mounted on said base, a plurality of cutter carrying spindle head units fixedly mounted on said frame to move simultaneously for effecting a cutting operation, a plurality of work stations disposed on said base in operating relationship with said spindle head units, each of said work stations being arranged to present a workpiece for operation upon by one of said cutters, and a transfer pin mounted on each of said spindle head units for axial movement in position to engage one of said workpieces when moved so that the workpiece will be caused to move with the spindle head unit, whereby said transfer pins may be positioned to engage the workpieces after the spindle head units have completed a cutting movement so that the workpieces will move with the spindle head units while they are travelling in their return movement for transferring the workpieces from one of said work stations to the succeeding work station.

2. In a machine tool having a base and a frame movably mounted on said base, a plurality of cutter carrying spindles rotatably mounted on said frame in spaced relationship to move with said frame for effecting a cutting operation, a plurality of work stations disposed on said base in operating relationship with said spindles, each of said work stations being arranged to present a workpiece for operation upon by one of said cutters, and a plurality of transfer pins mounted on said frame, each of said transfer pins being movable axially for engaging one of said workpieces upon the completion of a cutting operation so that the workpieces will be caused to move with the frame when it is travelling in its return movement after the completion of a cutting movement, whereby the frame will move the several workpieces to their respective succeeding work stations for another cutting operation.

3. In a machine tool having a base and a frame movably mounted on said base, a plurality of cutter carrying spindles rotatably mounted on said frame in spaced relationship to move with said frame for effecting several separate cutting operations successively on a workpiece, a plurality of work stations disposed on said base in operating relationship with said spindles, each of said work stations being arranged to cooperate with one of said spindles to present a workpiece for performing one of said cutting operations, and selectively actuable coupling means operable to couple the workpiece to said frame to move with it for transferring the workpiece from one of said work stations to the succeeding work station, whereby the workpiece may be transferred automatically through a plurality of work stations successively for performing a series of separate cutting operations.

4. In a machine tool, a base, a plurality of cutter carrying spindle head units mounted on said base for reciprocable movement to effect several separate cutting operations successively on a workpiece, a plurality of work stations disposed on said base in operating relationship with said spindle head units, each of said work stations being arranged to cooperate with one of said spindle head units to present and secure a workpiece for performing one of said cutting operations, and selectively actuable coupling means mounted on each of said spindle head units and operable to couple a workpiece to the spindle head unit to move with it for transferring the workpiece from one of said work stations to the succeeding work station, whereby the workpiece may be transferred automatically through a plurality of work stations successively for performing a series of separate cutting operations.

5. In a machine tool, a base, a plurality of cutter carrying spindle head units mounted on said base for reciprocable movement to effect several separate cutting operations successively on a workpiece, a plurality of work stations successively disposed on said base in operating relationship with said spindle head units, each of said work stations being arranged to cooperate with one of said spindle head units to present a workpiece for performing one of said cutting operations, a conveyor unit mounted in juxtaposition with the first of said work stations to introduce new workpieces to it for performing the first of said cutting operations, a second conveyor unit mounted in juxtaposition with the last of said work stations to receive the completed workpieces from it for removal from the machine, and selectively actuable coupling means mounted on each of said spindle head units and operable to couple a workpiece to the spindle head unit to move with it for transferring the workpiece from said first conveyor to the several work stations successively and thence to said second conveyor after the several cutting operations have been completed, whereby the workpiece is transferred automatically through the several work stations of the machine for performing a series of separate cutting operations.

6. In a machine tool, a base, a plurality of cutter carrying spindle head units mounted on said base for reciprocable movement to effect several separate cutting operations successively on a workpiece, a plurality of work stations successively disposed on said base in operating relationship with said spindle head units, each of said work stations being arranged to cooperate with one of said spindle head units to present a workpiece for performing one of said cutting operations, a loading station mounted in juxtaposition with the first of said work stations to receive new workpieces for introduction to said first work station for performing the first of said cutting operations, a receiving station mounted in juxtaposition with the last of said work stations to receive the completed workpieces from it for removal from the machine, and coupling means mounted on each of said spindle head units and operable to link a workpiece to the spindle head unit to move with it for transferring the workpiece from one of said stations to the next successively after the completion of each cutting operation, whereby the workpiece is transferred automatically through the several stations of the machine for performing a series of separate cutting operations.

7. In a machine tool, a base, a cutter carrying spindle head unit mounted on said base for reciprocable movement to effect a cutting operation on a workpiece, one direction of movement comprising a cutting movement and the other direction a return movement, a work station disposed on said base in operating relationship with said spindle head unit to present a workpiece to the spindle head unit for performing a cutting operation, a loading station mounted on one side of said work station to receive new workpieces for introduction to the work station, a receiving station mounted on the other side of said work station to receive the completed workpieces from it for removal from the machine, and coupling means mounted on said spindle head unit and operable to couple a workpiece to the spindle head unit after the completion of a cutting movement so that the workpiece will move with the spindle head unit in its return movement for transferring the workpiece from one of said stations to the succeeding station, whereby the workpiece is transferred automatically through the several stations of the machine.

8. In a machine tool, a base, a cutter carrying spindle head unit mounted on said base for reciprocable movement to effect a cutting operation on a workpiece, one direction of movement comprising a cutting movement and the other direction a return movement, a clamping unit disposed on said base in operating relationship with said spindle head unit to secure the workpiece in position for the spindle head unit to perform a cutting operation upon it, a loading station mounted on one side of said work station to receive new workpieces for introduction to the clamping unit, a receiving station mounted on the other side of said clamping unit to receive the completed workpieces from it for removal from the machine, and axially movable transfer pins mounted on said spindle head unit and operable to link workpieces to the spindle head unit after the completion of a cutting movement so that the workpieces will move with the spindle head unit in its return movement for transferring a new workpiece from the loading station to the clamping unit and the completed workpiece from the clamping unit to the receiving station, whereby the workpieces are transferred into and out of said clamping unit by the spindle head unit as it travels in its return movement.

9. In a machine tool, a base, a plurality of cutter carrying spindle head units mounted on said base for reciprocable movement to effect several separate cutting operations successively on a workpiece, a plurality of clamping units successively disposed on said base in operating relationship with said spindle head units, each of said clamping units being arranged to cooperate with one of said spindle head units to secure a workpiece in position for the spindle head unit to perform a cutting operation upon it, a loading conveyor disposed adjacent to the first of said clamping units to receive new workpieces for introduction to the first of said clamping units for performing the first of said cutting operations, a receiving conveyor disposed adjacent to the last of said clamping units to receive the completed workpieces from it for removal from the machine, and coupling means mounted on each of said spindle head units and operable to couple a workpiece to the spindle head unit so that it will move with it for transferring the workpiece from the loading conveyor to the first clamping unit and thence through the several clamping units successively, and from the last clamping unit to the receiving conveyor, with a transfer from one unit to the succeeding unit taking place after each cutting operation until the completed workpiece is transferred to the receiving conveyor, whereby the workpiece is transferred automatically through the several stations of the machine for performing a series of cutting operations upon it.

10. In a machine tool having an elongated base and a frame movably mounted on said base, a plurality of cutter carrying spindle heads supported by said frame, a plurality of workpiece stations located on said base in operating relationship with said cutters wherein the workpiece may be secured for operation upon said cutters, and a plurality of couplers carried by said spindle heads and arranged to be actuated after the completion of a cutting stroke by said spindle heads to couple the workpiece to the spindle heads while they are traveling in their return movement preparatory to another cutting operation so that they pull the workpiece with them to a succeeding station where another cutting operation may be performed.

11. In a machine tool having an elongated bed and a frame movably mounted on said bed, a plurality of cutter carrying spindle heads supported by said frame, a plurality of workpiece clamping mechanisms secured to said bed in operating relationship with said cutters for securing the workpiece in positions to be operated upon by said cutters, and a plurality of couplers carried by said spindle heads and arranged to be actuated after the completion of a cutting stroke by said spindle heads to couple the workpiece to the spindle heads while they are traveling in their return movement preparatory to another cutting operation so that they pull the workpiece with them from one of said clamping mechanisms to the next where another cutting operation may be performed.

12. In a machine tool having an elongated bed and a frame movably mounted on said bed, a plurality of cutter carrying spindle heads supported by said frame, a plurality of workpiece clamping mechanisms secured to said bed in operating relationship with said cutters for securing the workpieces in positions to be operated upon by said cutters, a plurality of axially movable pins carried by said spindle heads to engage said workpieces and thereby couple said workpieces to said spindle heads so that said spindle heads will pull the workpieces with them in their return movement from one of said clamping mechanisms to the next, and a control mechanism connected to effect engagement of said pins with said workpieces upon the completion of a cutting stroke by said spindle heads and disengagement upon the completion of a return movement, whereby said workpieces are moved from one clamping mechanism to the next after each cutting operation, by the spindle heads travelling in their return movement.

13. In a machine tool having a pair of beds parallelly disposed in juxtaposition, a frame movably mounted on one of said beds, a plurality of cutter carrying spindle heads supported by said frame, a loading conveyor fixedly secured on one end of said second bed for receiving workpieces to be machined, a receiving conveyor fixedly secured on the opposite end of said second bed for receiving the completed workpieces to discharge them from the machine, a plurality of clamping mechanisms rigidly mounted on said second bed between said loading and receiving conveyors in operating relationship with said spindle heads so that the workpieces may be securely clamped therein for operation upon by the cutters, and a plurality of couplers supported by said spindle heads and actuable to couple the workpieces to said spindle heads, said couplers being positioned on said spindle heads to engage the workpieces in said clamping mechanisms so that as the spindle heads travel in their return movement upon completing a cutting stroke they pull the workpieces with them into their succeeding clamping mechanisms, and from the last clamping mechanism to said receiving conveyor, whereby several cutting operations at separate stations may be performed on each workpiece, with the workpieces being moved automatically from station to station.

14. In a machine tool, a base, a plurality of cutter carrying spindle head units mounted on said base for reciprocable movement to effect several separate cutting operations successively on a workpiece, one direction of movement constituting a cutting movement and the other direction a return movement, a plurality of work stations successively disposed on said base in operating relationship with said spindle head units, each of said work stations being arranged to cooperate with one of said spindle head units to present a workpiece for performing one of said cutting operations, a loading station disposed adjacent to the first of said work stations to receive new workpieces for introduction to said first work station for performing the first of said cutting operations, a receiving station disposed adjacent to the last of said work stations to receive the completed workpieces from it for removal from the machine, coupling means mounted on each of said spindle head units and operable to couple a workpiece to the spindle head unit to move with it for transferring the workpiece from one of said stations to the next successively, and tripping means connected to actuate said coupling means, said tripping means being responsive to the position of said spindle head units to actuate the coupling means after the completion of a cutting operation to couple the workpieces to the respective spindle head units to move with them during their return movement, and to release the workpieces after the completion of the return movement so that the spindle head units may move with respect to the workpieces in their cutting movement, whereby the workpieces are transferred automatically through the several stations of the machine for performing a series of separate cutting operations.

15. In a machine tool, a base, a plurality of cutter carrying spindle head units mounted on said base for reciprocable movement to effect several separate cutting operations successively on a workpiece, one direction of movement constituting a cutting movement and the other direction a return movement, a plurality of clamping units successively disposed on said base in operating relationship with said spindle head units, each clamping unit being operable to secure a workpiece in position for operation upon by one of said cutters, a loading conveyor secured adjacent to the first of said clamping units to receive new workpieces for introduction to said first clamping unit for performing the first of said cutting operations, a receiving conveyor disposed adjacent to the last of said clamping units to receive the completed workpieces from it for removal from the machine, axially movable transfer pins mounted on said spindle head units in position to engage an opening in the workpieces to couple the workpieces to the spindle head units to move with them for transferring the workpieces from the loading conveyor to said first clamping unit and thence through the several clamping units successively and from the last clamping unit to the receiving conveyor, power means connected to actuate said transfer pins in their axial movement, and a tripping mechanism connected to control said power means and responsive to the position of said spindle head units to cause said power means to actuate the transfer pins to engage the workpieces after the completion of a cutting operation to couple the workpieces to the respective spindle head units to move with them during their return movement for transferring them from one station to the succeeding station, and to release the workpieces after the completion of the return movement so that the spindle head units may move with respect to the workpieces in their cutting movement, whereby the workpieces are transferred automatically through the several stations of the machine for performing a series of cutting operations.

16. In a machine tool, a base, a plurality of cutter carrying spindle head units mounted on said base for reciprocable movement to effect several separate cutting operations successively on a workpiece, one direction of movement constituting a cutting movement and the other direction a return movement, a plurality of clamping units successively disposed on said base in operating relationship with said spindle head units, each clamping unit being operable to secure a workpiece in position for operation upon by one of said cutters, a loading station disposed adjacent to the first of said clamping units to receive new workpieces for introduction to said first clamping unit for performing the first of said cutting operations, a receiving station disposed adjacent to the last of said clamping units to receive the completed workpieces from it for removal from the machine, axially movable transfer pins mounted on said spindle head units in position to engage an opening in the workpieces to couple the workpieces to the spindle head units to move with them for transferring the workpieces from the loading station to said first clamping unit and thence through the several clamping units successively and from the last clamping unit to the receiving station, power means connected to actuate said transfer pins in their axial movement and to operate said clamping units for clamping the workpieces therein, and a tripping mechanism connected to control said power means and respond to the position of said spindle head units to cause said power means to actuate the transfer pins to engage the workpieces and operate the clamping units to release the workpieces after the completion of a cutting operation so that the workpieces will be coupled to the spindle head units and be free to move with them in their return movement for transferring them from one station of the machine to the succeeding station, and to actuate the transfer pins to release the workpieces and operate the clamping units to secure the workpieces therein after the completion of the return movement so that the spindle head units may move with respect to the workpieces to perform a cutting operation upon them.

17. In a machine tool, a base, a plurality of cutter carrying spindle head units mounted on said base for reciprocable movement to effect several separate cutting operations successively on a workpiece, one direction of movement constituting a cutting movement and the other direction a return movement, a plurality of clamping units successively disposed on said base in operating relationship with said spindle head units, each clamping unit being operable to secure a workpiece in position for operation upon by one of said cutters, axially movable transfer pins mounted on said spindle head units in position to engage an opening in the workpieces to couple the workpieces to the spindle head units to move with them for transferring the workpieces from one of said clamping units to the succeeding clamping unit, power means connected to actuate said transfer pins in their axial movement, and a tripping mechanism connected to control said power means and responsive to the position of said spindle head units to cause said power means to actuate the transfer pins to engage the workpieces after the completion of a cutting operation to couple the workpieces to the respective spindle head units to move with them during their return movement for transferring them from one clamping unit to the succeeding clamping unit, and to release the workpieces after the completion of the return movement so that the spindle head units may move with respect to the workpieces in their cutting movement, whereby the workpieces are transferred automatically from one clamping unit to the succeeding one for performing a series of cutting operations.

18. In a machine tool, a base, a plurality of cutter carrying spindle head units mounted on said base for reciprocable movement to effect several separate cutting operations successively on a workpiece, one direction of movement constituting a cutting movement and the other direction a return movement, a plurality of clamping units successively disposed on said base in operating relationship with said spindle head units, each clamping unit being operable to secure a workpiece in position for operation upon by one of said cutters, axially movable transfer pins mounted on said spindle head units in position to engage an opening in the workpieces to couple the workpieces to the spindle head units so that they will move with them for transferring the workpieces from one of said clamping units to the succeeding clamping units successively, power means connected to actuate said transfer pins in their axial movement and to operate said clamping units for clamping the workpieces therein, and a tripping mechanism connected to control said power means and respond to the position of said spindle head units to cause said power means to actuate the transfer pins to engage the workpieces and operate the clamping units to release the workpieces after the completion of a cutting operation so that the workpieces will be coupled to the spindle head units and be free to move with them in their return movement for transferring them from one clamping unit to the succeeding clamping unit, and to actuate the transfer pins to release the workpieces and operate the clamping units to secure the workpieces therein after the completion of the return movement so that the spindle head units may move with respect to the workpieces to perform a cutting operation upon them.

References Cited in the file of this patent

UNITED STATES PATENTS

| | | |
|---|---|---|
| 1,892,120 | Topp | Dec. 27, 1932 |
| 2,004,540 | Smith et al. | June 11, 1935 |
| 2,104,756 | Oberhoffken | Jan. 11, 1938 |
| 2,518,086 | Snorek | Aug. 8, 1950 |
| 2,570,589 | Phillips | Oct. 9, 1951 |
| 2,625,861 | Swanson | Jan. 20, 1953 |